3,304,345
LIQUID THERMOSETTING RESINOUS MIXTURE STABILIZED WITH A SODIUM SALT OF A SULFONATED DI(ALKARYL)ALKYLENE COMPOUND
John R. Le Blanc, Wilbraham, Mass., assignor to Monsanto Company, a corporation of Delaware
No Drawing. Filed Dec. 30, 1963, Ser. No. 334,546
4 Claims. (Cl. 260—839)

This invention is directed to an improved thermosetting resin composition.

A thermosetting resin of an admixture of a phenol-formaldehyde resin and a melamine-formaldehyde resin have found use as binders for various materials. In particular, the resin system has found extensive use in the bonding of glass fibers and the so-called rock wool fibers. This resin combination has also found use as a low temperature binder for applications wherein the resin system is advanced to an infusible state at low temperatures for short periods of time. However, the resin system has a definite drawback in that a finely-divided precipitate forms when mixing the two resins together. The precipitate soon agglomerates and causes serious plugging of spray nozzles and other pieces of equipment. Many dispersing agents have been tried but fail to keep the particles suspended in the resin system. Therefore, it has been surprisingly discovered that a particular additive reduces the resin agglomeration and keeps the finely-divided particles in a colloidal suspension.

It is, therefore, an object of this invention to provide an improved thermosetting resin composition.

Other objects of this invention will in part be obvious and will in part be set out and appear hereinafter.

Briefly, these and other objects of this invention are attained by admixing a thermosetting phenol-formaldehyde reaction product with a thermosetting melamine-formaldehyde resin and a particular additive which is the sodium salt of a sulfonated di(alkaryl)alkylene compound.

The following examples are set forth to illustrate more clearly the principles and practices of this invention to one skilled in the art and they are not intended to be restrictive but merely to be illustrative of the invention herein contained. Unless otherwise stated herein, all parts and percentages are on a weight basis.

EXAMPLE I

Part A

To a reaction vessel fitted with an agitator, heater and condenser for refluxing under vacuum conditions, add 100 parts of phenol, 200 parts of 50% formalin and 3.5 parts of calcium hydroxide to provide a pH of about 8.0–9.0. The reaction is carried out at a temperature of about 60–62° C. for about three hours. The product is then cooled to about 30° C. and the pH is adjusted to 5.0–6.5 with hydrochloric acid. The resin is then cooled to room temperature. The reaction product is found to be infinitely water-dilutable in that 24 or more volumes of water can be mixed with one volume of the resin at a temperature of 24–26° C. without causing the mixture to exhibit haziness or milkiness.

Part B

To 4 parts of the resin solids of Example I, 1 part of the resin solids of a liquid methylated melamine-formaldehyde resin is added under agitation. The resin employed herein is the methylated reaction product of 3.5 mols of formaldehyde per mol of melamine. At the end of 1 hour of agitation considerable agglomerates are noticed indicating that precipitation has formed.

EXAMPLE II

Example I, Parts A and B is repeated except that to the solution 0.1 weight percent based on the weight of the resin solids of the sodium salt of a sulfonated di(propyl phenyl)methane compound is added. At the end of 8 hours no agglomerates are noticed. The particles are finely-dispersed in a colloidal suspension.

EXAMPLE III

Example II is repeated except that 0.2 weight percent of the sodium salt of a sulfonated di(propyl phenyl)methane compound is employed herein.

The results obtained are essentially the same as in Example II.

The instant invention is directed to an improved thermosetting resin composition consisting of in admixture a liquid phenol-formaldehyde condensate and a condensate selected from the group consisting of melamine-formaldehyde and substituted melamine-formaldehyde. The improvement consists of the addition of a stabilizer to the resin system so as to maintain the finely-divided particles in a colloidal suspension. It is known that when combining phenol-formaldehyde and melamine-formaldehyde condensation products, a finely-divided resin precipitate occurs which upon standing agglomerates. These agglomerates cause unnecessary downtime of equipment because of plugging of spray nozzles and other pieces of equipment. Such agglomerates also enter the system to cause unsatisfactory treated materials when the resins are used to impregnate fibrous substrates. It has been surprisingly discovered that when employing a particular stabilizer in the practice of this invention, the stabilizer keeps the finely-divided resin particles in a colloidal suspension. In this state, the finely-divided resin particles so suspended do not cause difficulty in either plugging equipment or unsatisfactory treated materials impregnated therewith.

The stabilizers employed herein are the sodium salts of sulfonated di(alkaryl)alkylene compounds. They are employed in the amount of 0.05–0.5 weight percent and, preferably, 0.1–0.2 weight percent based on the weight of the total resin solids. The stabilizer employed herein can best be described by the following formula:

NaSO$_3$RR'RSO$_3$Na wherein R is an alkaryl radical of 1–2 benzene rings and R' is an alkyl radical of 1–5 carbon atoms. The alkyl portion of the alkaryl radical contains 0–5 carbon atoms. In a more preferred embodiment of the instant invention, the stabilizer employed herein is the sodium salt of a disulfonated di(propyl phenyl)methane compound. This can best be described as follows:

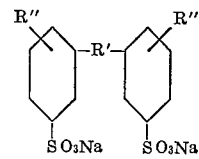

wherein R'' is a propyl radical of 3 carbon atoms and R' is methane.

The phenol-formaldehyde condensate and the melamine-formaldehyde condensate employed herein can be admixed in the range of 30–90 weight percent of the phenol-formaldehyde resin and, correspondigly, 70–10 weight percent of the melamine-formaldehyde resin. However, it is preferable to use the condensates in the proportions of 50–90 weight percent of the phenol-formaldehyde resin and, correspondigly, 50–10 weight percent of the melamine-formaldehyde resin.

The phenol-formaldehyde condensate employed in the practice of this invention is a liquid prepared by the condensation reaction of 1.0–4.0 mols of formaldehyde per mol of phenol using an alkaline catalyst. The reaction is carried out or reacted at a temperature of between 50–70° C. and, preferably, 60–65° C. and at a pH of 5.0–11.0 and, preferably, 8.0–9.5. At the end of the reaction if desired the pH may be adjusted to 5.0–7.0 with hydrochloric acid. The liquid phenol-formaldehyde condensate so prepared herein is a one-stage resin prepared by the condensation reaction of 1.0–4.0 mols of formaldehyde and, preferably, 2.5–4.0 mols per mol of phenol under alkaline conditions. The condensate is recovered in a liquid medium which can be either water, a water-organic solvent or an organic solvent.

As stated previously, the material admixed with the liquid phenol-formaldehyde condensate is a melamine-formaldehyde resin. The melamine-formaldehyde condensates suitable for use herein are melamine-formaldehyde and substituted melamine-formaldehyde condensates. The substituted melamine-formaldehyde condensates are the alkyl and aryl melamine-formaldehyde resins wherein the alkyl groups can contain 1–6 carbon atoms per each alkyl group and, preferably, 1–4 carbon atoms. Typical examples of some of the alkyl substituted melamine-formaldehyde condensates are the monomethyl, dimethyl, trimethyl, monoethyl and 1-methyl-3-propyl-5-butyl melamine-formaldehyde condensates. Mixtures of the above alkyl substituted melamine-formaldehyde condensates may be employed herein. The aryl substituted melamine-formaldehyde condensates can contain 1–2 phenyl radicals and, preferably, 1 phenyl radical per each aryl substituted group. Some of the aryl substituted melamine-formaldehyde condensates are monophenyl and diphenyl melamine-formaldehyde resins. Mixtures of the aryl substituted melamine-formeldehyde resins may be employed herein. It should also be noted that mixtures of melamine-formaldehyde condensates and substituted melamine-formaldehyde condensates may also be used. The preferred material employed in admixture with the phenol-formaldehyde condensate is a methylated melamine-formaldehyde condensate.

It will thus be seen that the objects set forth above, among those made apparent from the preceding description are efficiently attained and since certain changes may be made in carrying out the above process or method without departing from the scope of the invention, it is intended that all matter contained in the above description shall be interpreted as illustrative and not in a limiting sense.

What is claimed is:

1. An improved thermosetting resin composition consisting of in admixture a liquid thermosetting phenol-formaldehyde condensate and a thermosetting condensate selected from the group consisting of melamine-formaldehyde and substituted melamine-formaldehyde; the improvement being in the addition of 0.05–0.5 weight percent of a stabilizer which stabilizer is the sodium salt of a disulfonated di(alkaryl)alkylene compound wherein the aryl group contains 1–2 benzene rings, the alkyl proportion of the alkaryl group contains 0–5 carbon atoms and the alkylene group contains 1–5 carbon atoms.

2. The composition of claim 1 wherein the stabilizer is present in an amount of 0.1–0.2 weight percent.

3. The composition of claim 1 wherein the stabilizer contains 2 benzene rings.

4. The composition of claim 1 wherein the stabilizer is the sodium salt of a disulfonated di(propyl phenyl)methane compound.

References Cited by the Examiner

UNITED STATES PATENTS

| | | | |
|---|---|---|---|
| 2,563,898 | 8/1951 | Wilson et al. | 260—839 |
| 2,620,353 | 12/1952 | Lippincott et al. | 260—505 |

FOREIGN PATENTS

| | | |
|---|---|---|
| 551,858 | 1/1958 | Canada. |

OTHER REFERENCES

Schwartz et al.: Surface Active Agents, vol. 1, Interscience, N.Y., 1949, page 119. (Copy in Group 140.)

MURRAY TILLMAN, *Primary Examiner.*

J. C. BLEUTGE, *Assistant Examiner.*